3,788,861
HYDROMILLING OF WHEAT
Jack R. Durst, Osseo, and William C. Winters, Minneapolis, Minn., assignors to The Pillsbury Company, Minneapolis, Minn.
Filed June 18, 1971, Ser. No. 154,538
Int. Cl. A23l 1/10
U.S. Cl. 426—385  21 Claims

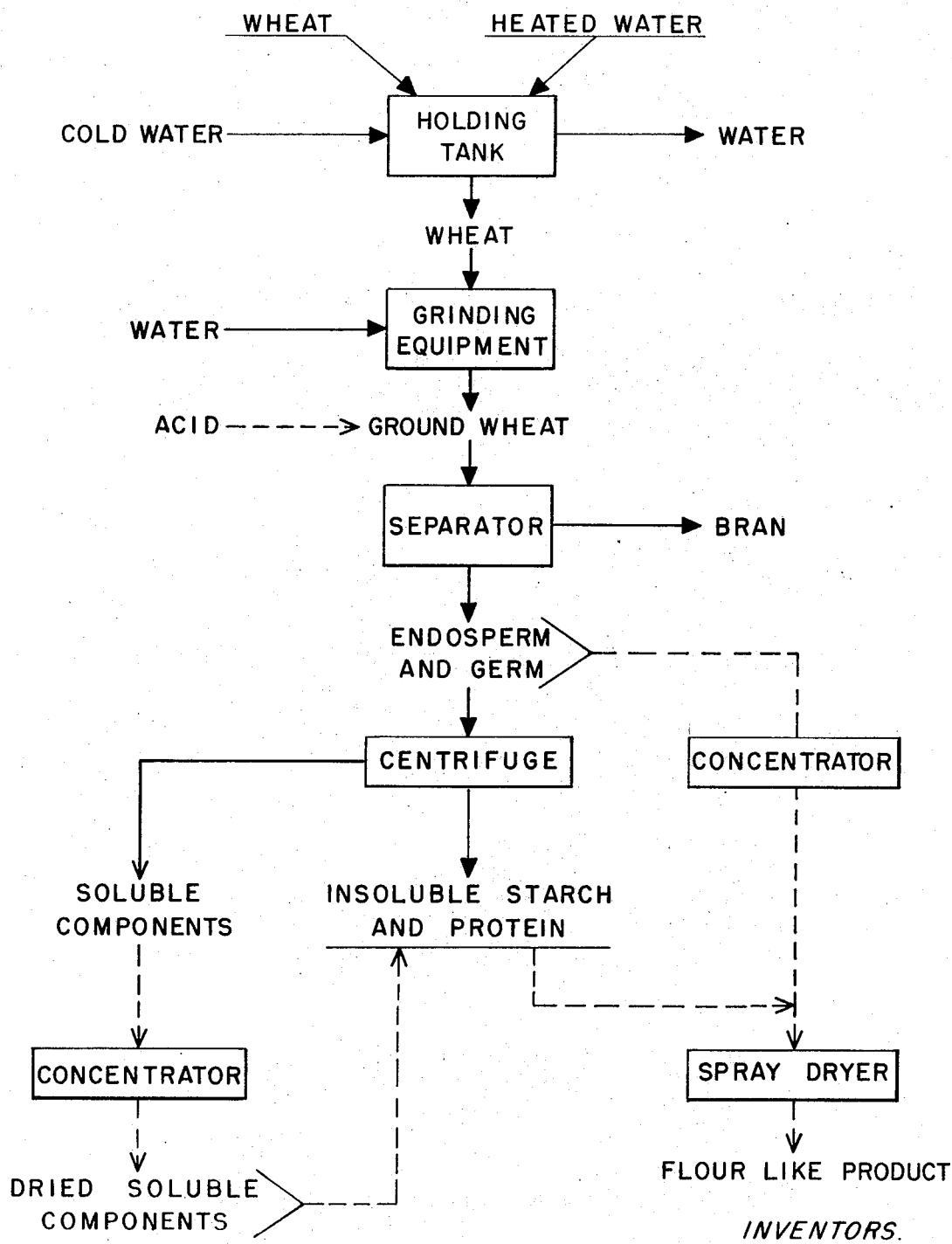

ABSTRACT OF THE DISCLOSURE

A process for hydromilling wheat is provided by grinding the wheat kernels or berries in an aqueous medium containing 3.5 to about 15 parts by weight water per part by weight wheat at a temperature not exceeding 104° F. to reduce all of the components, except the wheat bran, to a particle size of less than 200 microns; separating the bran from the aqueous hydromilled wheat product containing the endosperm and germ components; and removing a portion of the water from the hydromilled wheat product. Throughout this process, substantially all of the starch granules are maintained in the intact, ungelatinized form and substantially all of the protein is maintained in an undenatured form, thereby providing a hydromilled wheat product having excellent doughing and baking properties.

BACKGROUND OF THE INVENTION

The present invention is directed to a process for hydromilling wheat wherein substantially all of the starch granules are maintained in the intact, ungelatinized form and substantially all of the protein is maintained in an undenatured form. The hydromilled product has excellent doughing and baking properties.

A wheat kernel consists of three major portions, the endosperm, the germ and the bran. The outer fibrous portion of each kernel is the bran envelope. Inside this bran envelope is the endosperm (the primary source of white flour) and the germ. In terms of the total weight of the kernel, the bran envelope comprises about 14½% of the weight, the endosperm comprises about 83% of the weight, and the germ comprises about 2½% of the weight.

During conventional dry milling, most of the bran and the germ are mechanically removed from the endosperm and the endosperm is then ground to form flour. The bran is removed and discarded as a by-product because it is the primary source of off-color components and is largely comprised of cellulose fibers which are difficult to digest. The outer, relatively thick layer of the endosperm, the aleurone layer, adheres to the bran and must generally be discarded as a by-product with the bran. The germ is also removed and discarded because of the propensity of the unsaturated fats contained therein to oxidize and the concomitant rancid odor of those oxidized fats. The typical yield of white flour from a conventional dry milling process is from 72% to 74% by weight of the total input wheat.

Wheat flour, to be useful in baking leavened products such as breads and cakes, must have both doughing and baking properties. Doughing describes the phenomenon by which the loose mass of flour particles, when admixed with water, becomes a cohesive, resilient body of dough. The doughing characteristics are primarily ascribed to the significant portion of gluten protein present in wheat flour. The gluten is thought to exist in the initial flour in the form of randomly arranged particles. When exposed to water, these particles hydrate and if then subjected to mixing, tend to elongate into chains or strands. As mixing continues, the strands are repeatedly stretched and relaxed being reoriented into a parallel arrangement, and producing a tough, resilient matrix for the starch particles which is well adapted to entrap and retain gas bubbles, including those of air introduced during mixing and those of the leavening gas. The mechanism of gluten development is not completely understood, but the above description generally describes that characteristic of wheat flour known as "doughing."

Baking properties of wheat flour generally refer to the ability of the dough to rise and to solidify into a definite structure. The starch granules of the dough are gelatinized and thus held in place in the protein matrix.

For several hundreds of years, dry milling was the only process of milling wheat. In more recent times, various techniques for wet milling wheat have been tried with limited degrees of success. Rakowsky et al., U.S. Pat. No. 2,358,827 discloses a method for hydromilling wheat to obtain flour. In this method, the wheat is subjected to temperatures ranging from about 140° F. to 200° F. for from 5 to 10 minutes, after which the wheat is ground with at least 2 parts by weight water per part by weight wheat. During the grinding operation, the aqueous pulp is heated to between 140° F. and 200° F. for 10 to 30 minutes. After the grinding operation, the bran is separated from the wheat components and the filtrate is dried at temperatures ranging from 150° F. to 200° F. In this process, however, the starch obtained from the wheat is completely gelatinized and the gluten protein is completely denatured. Because of the starch gelatinization and the gluten denaturation, the doughing and baking characteristics of the farinaceous product obtained thereby are completely destroyed. The resultant product is, therefore, useless in making leavened products such as breads and cakes.

Additional methods for milling wheat using various wet milling and grinding techniques are illustrated in De Sollano et al., U.S. Pat. No. 2,930,699; Bartmann, U.S. Pat. No. 1,670,015; and Chidlow, U.S. Pat. No. 1,255,293.

Wet milling of corn has, in the past, enjoyed more success than the wet milling of wheat. This is primarily true because the gluten protein of the corn is deliberately degraded in the process of wet milling corn to prevent "doughing" during the processing steps and the concomitant problems involving separation of the husk, starch and protein.

Because starch is the primary desired constituent of corn, and because the protein content of corn is relatively small, wet milling of corn by degrading the gluten protein is efficient and economical. A series of articles entitled "Wet Process Corn Milling" by Bartline appeared in the American Miller describing this process, e.g., see American Miller, August 1940, pp. 40, 41 and 82; September 1940, pp. 46–48 and 58; October 1940, pp. 28 and 30; December 1940, pp. 25–28, 30 and 84–85; February 1941, pp. 32–34 and 89; March 1941, pp. 48, 50, 97 and 98; May 1941, pp. 34–46, 104 and 105; June 1941, pp. 38, 40, 98 and 99; August 1941, pp. 40, 42, 44, 81 and 82; October 1941, pp. 46, 47 and 85; November 1941, pp. 32, 33 and 37; and December 1941, pp. 34, 47 and 86.

Other articles showing wet milling of corn and grain sorghum are Watson et al., "Laboratory Steeping Procedures Used in a Wet Milling Research Program," Cereal Chem., vol. 28, 1951, pp. 105–118 and Anderson, "A Pilot Plant for Wet Milling," Cereal Science Today, April 1957, pp. 78–80. Illustrative of patents disclosing the wet milling of corn are Landers, U.S. Pat. No. 1,391,065; Sherman, U.S. Pat. No. 1,554,301; Eckers, U.S. Pat. No. 2,556,322; Newkirk et al., U.S Pat. No. 2,573,048; Dowie, U.S. Pat. No. 3,029,169; Slotter et al., U.S. Pat. No. 2,527,585; Burkhardt, U.S. Pat. No. 251,827 and Willford, U.S. Pat. No. 1,061,933.

Although much has been written describing various wet milling techniques for various grains, no economical or efficient method of hydromilling wheat to obtain a hydromilled wheat product having good doughing and baking characteristics is presently available. Additionally, there is no milling process presently being used in which the aleurone layer of the endosperm can be recovered as a white flour component. Furthermore, conventional processes for making white flour cannot utilize the germ without running the risk of developing rancid odors.

SUMMARY OF THE INVENTION

The primary object of this invention is to provide an efficient, commercially operable method of hydromilling wheat wherein the hydromilled wheat product contains all of the wheat components except the bran in substantially theoretical yields, and wherein the hydromilled wheat product has excellent doughing and baking properties.

Another object is to provide a method for hydromilling wheat wherein the bran is separated from the endosperm (including the aleurone layer) and the germ and wherein there is no denaturation of the gluten protein or gelatinization of the starch during hydromilling.

A further object is to provide a method for hydromilling wheat wherein the germ can be utilized in the hydromilled wheat product without the development of rancid odors due to oxidation of unsaturated fats contained in the germ.

Another object is to provide a method for hydromilling wheat wherein the albumin and globular proteins of the aleurone and the germ are not denatured.

The above and other objects are attained by the process for hydromilling wheat of this invention which comprises the steps of grinding the wheat in an aqueous medium containing 3.5 to about 15 parts by weight water per part by weight wheat at a temperature not exceeding 104° F. to reduce the endosperm and the germ components of the wheat to a particle size of less than 200 microns while maintaining at least 90% by weight of the bran envelope above a minimum dimension of 150 microns; separating the bran from the aqueous hydromilled wheat product containing the endosperm and the germ components; and removing a portion of the water from the hydromilled wheat product. Throughout all of the above steps, substantially all of the starch granules in the hydromilled wheat product are maintained in the intact, ungelatinized form, substantially all of the gluten protein in the hydromilled wheat product is maintained in an undenatured and non-glutenized form and substantially all of the albumin and globular proteins are maintained in an undenatured form.

To prevent coloration of the hydromilled wheat product of this process, it is desirable and preferred that the polyphenol oxidase enzymes in the wheat bran be either removed or denatured prior to the grinding step. The oxidase activity level should be reduced to below about 9 activity units. After grinding step, the pH of the resultant aqueous dispersion should be adjusted to between about 5.0 and about 6.1 to maintain consistent whiteness in the final product.

A significant advantage of the process of this invention is that all of the wheat components except the bran are utilized in the final product. The yield of product in this hydromilling process is accordingly significantly higher than, for example, in conventional dry milling wherein the aleurone layer of the endosperm and the germ are discarded as by-products. The lysine-rich albumin and globular proteins of the aleurone layer and the germ also reduce the normal lysine deficiency of conventional flour. See "Proteins as Human Food" (ed., Lawrie, 1970) The Avi Publishing Company, Inc.

The hydromilled wheat product can be utilized as a baking ingredient or it can be further separated into its component parts.

BRIEF DESCRIPTION OF THE DRAWINGS

FIG. 1 is a schematic flow diagram of the process wherein dotted lines indicate alternative treatments.

DESCRIPTION OF THE PREFERRED EMBODIMENTS

This process for hydromilling wheat is comprised of three primary steps. The first step of the process comprises grinding the wheat in an aqueous medium containing 3.5 to about 15 parts by weight water per part by weight wheat at a temperature not exceeding 104° F. to reduce the endosperm and the germ components of the wheat to a particle size of less than 200 microns while maintaining at least 90% by weight of the bran envelope above a minimum dimension of 150 microns. After the grinding step, the bran is separated from the aqueous hydromilled wheat product containing the endosperm and germ components. Some of the water is then removed from the aqueous hydromilled wheat product. The amount of water removed is primarily dependent upon the end use of the product. Throughout this process, substantially all of the starch granules are maintained in the intact, ungelatinized form and substantially all of the protein is maintained in an undenatured, unglutenized form.

To obtain maximum whiteness in the final product, the polyphenol oxidase enzymes contained in the bran should be removed or denatured prior to the grinding step to obtain an oxidase activity level of below about 9.0 activity units. To maintain maximum whiteness, the pH of the aqueous hydromilled wheat product should be adjusted to from about 5.0 to about 6.1 after completion of the grinding step.

The various steps of this hydromilling process will be described more specifically and in sequence even though the whiteness control steps are not absolutely necessary in the practice of this invention.

Reduction of polyphenol oxidase activity

The outer layer of bran, usually referred to as the testa or beeswing, comprises the epidermis and hypodermis of the wheat and contains large concentrations of polyphenol oxidase enzymes. The enzymes impart a tan or brown color to the hydromilled wheat product from the process of this invention. Accordingly, it is preferred to remove or destroy sufficient amounts of these enzymes to prevent discoloration of the hydromilled wheat product. Discoloration of the final product can be minimized by reducing the activity level of these enzymes from the normal activity level of about 20.0 activity units to between 0 and 9 activity units and, preferably, between 0 and 6 activity units.

The polyphenol oxidase activity level, as used herein, is calculated by the procedure of Milner, Cereal Chemistry, vol. 28 (1951), pp. 435–448. Specifically, catechol and ascorbic acid in a buffered solution are added to the dry product, i.e., the untreated wheat or the wheat treated to remove or destroy the polyphenol oxidase enzymes. Oxygen is then passed over the mixture for one hour at 25° C. while the sample is agitated. As the catechol is oxidized, it is reduced by the ascorbic acid. At the end of the one-hour reaction period, the amount of unreacted ascorbic acid is measured. Polyphenol oxidase activity (expressed in activity units) is defined as the milligrams of ascorbic acid destroyed in one hour under the above conditions by one gram of untreated wheat or by one gram of wheat treated to remove or destroy the polyphenol oxidase enzymes.

The polyphenol oxidase enzymes can be removed or destroyed by several techniques. The testa or beeswing can be mechanically removed by various abrading devices known in the art. These abrading devices include conventional barley purlers or rice purlers. The screen sizes and the coarseness of the abrasive disks or sheets used in these purlers may be varied slightly to attain optimum removal of the beeswing.

However, the preferred method of reducing the activity level of the polyphenol oxidase enzymes is to treat the wheat with steam, boiling water, or water at elevated temperatures somewhat below boiling. The residence time and the temperature of the treatment fluid must be carefully regulated at these elevated temperatures to prevent gelatinization of the starch granules and denaturation of the gluten protein.

Table I below illustrates the effects of boiling water on wheat. The wheat utilized in Table I was comprised of 75% spring wheat and 25% selected winter wheat. The wheat was treated with boiling water in a batch process. In each case, the wheat was cooled with tap water immediately after the indicated length of the treatment. Starch gelatinization was determined by the Cross-Nickels procedure (explained in detail hereinafter in the section entitled, "The Starch Granules and Gluten Proteins"). Gluten denaturization was determined subjectively by observing bread baked from the hydromilled wheat product.

TABLE I.—TREATMENT OF WHEAT WITH BOILING WATER

| Treatment | Activity units | Color | Percent Starch gelatinization | Gluten degradation |
| --- | --- | --- | --- | --- |
| None | 17.3 | Tan | None | None |
| Minutes boiling water: | | | | |
| 0.5 | 7.0 | Off-white with yellowish cast. | None | None |
| 1.0 | 5.0 | ___do___ | 1 | 50 |
| 2.0 | 4.0 | ___do___ | 1 | 75 |
| 5.0 | 3.5 | ___do___ | 10 | 100 |
| 15.0 | 2.6 | ___do___ | 50 | 100 |

Table I indicates that treatment of wheat with boiling water for 30 seconds satisfactorily reduces the activity level of the polyphenol oxidase enzymes without causing undesirable gelatinization of the starch granules and denaturation of the gluten protein. If the wheat is treated for longer periods of time with boiling water, for example 60 seconds, some denaturation of the gluten protein occurs. This is highly undesirable as the doughing and baking properties of the hydromilled wheat product are adversely affected. When wheat is treated with boiling water for extended periods of time, essentially all of the gluten protein is denatured and all of the starch is gelatinized. The hydromilled product obtained after such treatment is essentially useless for usual baking purposes.

Denaturation of polyphenol oxidase enzymes is dependent on both the temperature of the treatment fluid and residence time or contact time. Therefore, the wheat can be treated for longer periods of time at lower temperatures and correspondingly shorter periods of time at higher temperatures. However, in any treatment of wheat by this process, it is essential that gelatinization of the starch granules and denaturation of the gluten protein be avoided. Therefore, in varying the time-temperature relationship as set forth above, care should be taken to monitor the effect of time and temperature on the gelatinization of starch and denaturation of gluten protein.

After the heat treatment as described above, the wheat is promptly cooled, for example, with cold tap water to prevent any adverse gelatinization of the starch and denaturation of the gluten protein.

The preferred heat treatment can be performed in a batch operation or in a continuous operation. In the batch operation, wheat is simply introduced into a suitable container containing boiling water or steam. After about 30 seconds, the wheat is removed from the batch vessel and immersed in cold water to cool the wheat to room temperature. In a continuous operation, wheat and boiling water can be introduced into, for example, a screw conveyor and the screw can be rotated at a suitable speed to insure contact time of about 30 seconds. Cold water is then introduced to cool the wheat to about room temperature.

In the above methods for removing or denaturing the polyphenol oxidase enzymes, the wheat kernels so treated are generally intact, the starch granules are intact and ungelatinized and the gluten protein is undenatured.

Grinding the wheat

In the hydromilling process of this invention, wheat is ground in an aqueous medium containing from about 3.5 to about 15 parts by weight water per part by weight wheat at a temperature not exceeding 104° F. to reduce all the components of the wheat, except the bran, to a particle size of less than 200 microns. More specifically, the endosperm and the germ are reduced to a particle size of less than 200 microns while maintaining at least 90% by weight of the bran envelope above a minimum dimension of 150 microns.

The weight ratio of wheat to water is extremely important in this process. Within the indicated weight ratios, the gluten protein is uniformly dispersed in the aqueous medium, is nonassociated and does not cause doughing in the aqueous hydromilled wheat.

At weight ratios of wheat to water below the lower limit of 1:3.5, there is significant gluten development and doughing of the hydromilled product. As the gluten develops, the hydromilled wheat product is formed into a sticky, glue-like mass. The bran particles are securely held within this sticky mass and are very difficult to remove from the mass without significant denaturation of the gluten protein. Preferably, to avoid any development of the hydromilled wheat product, the wheat to water ratio should be above 1:4.5.

The upper weight ratio limit of one part wheat to 15 parts water was determined solely on the basis of economics. The water must be removed from the hydromilled wheat product prior to use in its various applications. Therefore, large amounts of water in this hydromilling process are not economically advantageous.

The preferred range of wheat to water in this process, on a weight basis, is from 1:4.5 to 1:8. In this weight range, there is no significant gluten development or doughing of the hydromilled wheat product and excess amounts of water having no useful function in the process are not introduced into the hydromilled wheat product. The most preferred weight ratio of wheat to water in this grinding step is about 1:5.

The weight ratio of wheat to water can be significantly lowered by the addition of an oil to the wheat and water mixture prior to grinding. The oil apparently inhibits gluten development during the grinding step and prevents formation of sticky masses within the hydromilled wheat product.

Any edible oil having a melting point below about 104° F. (the maximum temperature during the grinding step) can be utilized in the wheat and water mixture. It is, of course, preferred that high quality, stable oils be utilized herein to minimize rancidity problems. Representative of the oils that can be utilized herein are coconut oil, corn oil, palm oil, olive oil, safflower oil, soybean oil, sunflower oil, peanut oil, and cottonseed oil. Any of the synthetically derived oils having a melting point below 104° F. can also be utilized herein.

To obtain the water reduction above referred to, from 0.005 to 4 parts by weight oil per part of wheat are added to the wheat and water mixture prior to grinding. Preferably, from 0.01 to 0.05 part oil per part of wheat are added to minimize the amount of water utilized in the grinding step while maximizing the quality of the hydromilled wheat product. When oil is utilized in the above amounts, the weight ratio of wheat to water can be lowered to about 1:1, preferably about 1:2.

The addition of oil to the wheat and water mixture prior or to grinding can be used to advantage in some instances. For example, the oil in the final hydromilled wheat product can be substituted for a portion of the shortening in baked products. However, if an oil-free product is desired, it is generally not advantageous to add oil to the wheat and water mixture prior to grinding because the oil is very difficult to remove from the final hydromilled product.

The aleurone layer of the endosperm contains albumin globular proteins which are soluble in water and dilute salt solutions, respectively, and are excellent film formers. During the grinding step, these film formers are liberated from the aleurone layer and the germ and are apparently, instrumental in encapsulating the oil from the germ and any oil added to the wheat and water mixture prior to grinding. Because the oils are encapsulated, there is virtually no problem with rancidification of the oils and none of the odor problems associated with such rancid oils. By controlling rancidification in this manner, the germ can be fully utilized in the hydromilled wheat product.

The temperature of the aqueous medium during the grinding step in this hydromilling process should preferably not exceed 104° F. At approximately this temperature, some of the larger starch granules in the hydromilled wheat product will begin to gelatinize and the gluten protein will be denatured. The temperature of the aqueous medium during the grinding step can range, generally, from about 32° F. to 104° F. It is desirable to maintain the temperature of the aqueous medium above 32° F. to prevent the formation of ice on the grinding equipment.

It is preferable to maintain the temperature of the aqueout medium below 100° F. as some gluten protein denaturation can occur at about 100° F. It should be understood that the aqueous medium can be maintained at significantly higher temperatures for very short periods of time as both starch gelatinization and protein denaturation are dependent on a relationship between the residence time and the temperature of the aqueous medium. However, in the usual practice of this invention, the temperature is preferably maintained below 100° F. at all times to insure that starch gelatinization and gluten protein denaturation do not occur.

It is highly preferred in this invention to maintain the aqueous medium at temperatures ranging from 32° F. to 72° F during the grinding process. In this temperature range, ice will not form on equipment used in the process, there is no starch gelatinization or gluten protein denaturation and the rate of reaction of any polyphenol oxidase enzymes in the hydromilled wheat product is significantly reduced when compared with the rate of reaction at higher temperatures. Other chemical reactions which may introduce color into the hydromilled wheat product are also inhibited and bacterial growth is minimized in this preferred temperature range.

Functionally, the wheat kernels are ground in the heretofore described aqueous medium. The grinding action should be sufficient to reduce the endosperm and germ components to a particle size of less than about 200 microns while maintaining at least 90% by weight of the bran envelope above a minimum dimension of 150 microns. As the individual starch granules range in size from 10 to 120 microns, virtually none of the starch granules are ruptured or damaged during the grinding process. The protein matrix is sheared into portions of less than 200 microns which are readily separated from the bran. The starch granules are predominantly free and unassociated with the protein.

A portion of the water present in the grinding step is absorbed by the bran envelope before and during the grinding step. The water renders the bran envelope more resilient than the dry bran envelope and, accordingly, the bran envelope is more resistant to shattering during grinding. Generally, most of the fibrous bran envelope is reduced to particle sizes ranging from 0.5 millimeter to 64 millimeters with minor portions of the bran envelope being reduced to particle sizes ranging down to 150 microns. To obtain adequate separation of the bran particles from the endosperm and germ components, at least 90% by weight of the bran envelope should be maintained above a minimum dimension of 150 microns and, preferably, 95% by weight should be maintained above 200 microns.

A variety of grinding equipment can be used herein. The preferred type of grinding equipment comprises that class of equipment capable of high-shear mixing. Machines providing high-speed mixing and having high-speed cutting and propelling blades are most useful herein to separate the bran from the germ and the endosperm including the aleurone layer. In small-scale operations, a Waring Blendor can be used to advantage. In larger-scale operations, turbine mixers and propeller mixers can be readily utilized. With both turbine mixers and propeller mixers, the blades revolve at high speeds and can cut and separate the bran from the endosperm and germ.

Disk attrition mills are highly preferred for use in this step of the hydromilling process. Grinding takes place between abrasive grinding plates which may operate in a vertical or a horizontal plane. One or both plates may be rotated. Generally, the distance between the plates can be regulated to allow these mills to be used for pulverizing, coarse grinding, granulating, cracking or fluffing. These mills are also generally provided with a water jacket thereby facilitating temperature control of the aqueous medium containing the wheat. For a more complete description of these mills, see J. Perry, Chemical Engineers Handbook (3rd ed., 1950), pp. 1143–44.

Conventional roller milling equipment can be used but is not preferred herein. Conventional roller mills have a tendency to associate the gluten and may cause some doughing of the hydromilled wheat product. Developed gluten can secure the bran in the hydromilled product rendering the bran difficult to remove.

The time required for grinding is primarily dependent upon the type of equipment used. Therefore, prior to use in a commercial operation, the equipment should be tested to determine preferred residence times within specific grinding equipment. Generally, the grinding process requires from about 6 to about 15 minutes.

To prevent a temperature rise in the mass of material being mixed, the equipment is preferably cooled in some manner. In a small-scale operation wherein a Waring Blendor is used, ice can advantageously be added to the aqueous medium containing the wheat. In larger commercial operations, it is preferred that a cooling jacket be utilized around the equipment and cooled brine or water circulated therethrough. In this manner, the aqueous medium can be maintained at the preferred temperature of from about 32° F. to about 72° F.

Color control after grinding

The wheat germ contains flavonols and derivatives of flavonols. These flavonols are essentially colorless under acid conditions. At neutrality, however, these flavonols impart a pale, yellow-green color to the hydromilled wheat product and, under alkaline conditions, these flavonols impart a bright yellow color to the hydromilled product. The pH of the hydromilled product generally ranges from about 6.7 to 7.0 and the product is, therefore, slightly colored.

It is desirable to maintain the pH of the aqueous medium after grinding at a pH below 7 and preferably below 6.1 to minimize the coloration of the hydromilled wheat product. It is also desirable to maintain the pH of the aqueous medium above 5 during and after grinding. Below a pH of 5, the gluten protein is increasingly solubilized down to pH 3 while above a pH of 5 the gluten protein components are only limitedly soluble being least soluble at pH of 6.1. To obtain minimum protein solubilization and minimum coloration of the final hydromilled product, it is preferred to maintain the pH of the aqueous medium in the range of 5.6 to 6.1 with a pH of 5.8 being especially preferred. Most acids can be utilized to reduce the pH of the aqueous medium and the hydromilled wheat product. For example, the following acids can be utilized herein: hydrochloric acid, sulfuric acid, lactic acid, citric acd, and phosphoric acid. Hydrochloric acid is preferred for use for this color control step.

Removal of bran from hydromilled endosperm and germ

In this step, the brain is separated from the aqueous hydromilled wheat product containing the endosperm and the germ components. The temperature of the aqueous hydromilled product should be maintained between about 32° F. and 104° F. Preferably, the temperature is maintained at below 100° F. and, most preferably, the temperature is maintained at between 32° F. and 72° F.

Separation of the bran from the endosperm and the germ can be accomplished by many conventional means. Where large capacity and high efficiency is desired, the use of vibrating and oscillating screens is highly preferred. The capacity of vibrating screens, especially in the finer sizes, it much greater than other types of screens. Another advantage of these screens is that vibration of the screen cloth reduces the blinding effect to a minimum.

An ordinary vibrating screen consists essentially of a flat or slightly convex screen surface to which is applied a rapid vibration normal or nearly normal to the surface. The vibrating means may be eccentric shafts, an unbalanced flywheel, a cam and tappet arrangement, or an electromagnet. A complete discussion of vibrating and oscillating screens can be obtained in J. Perry, Chemical Engineers' Handbook (3rd ed., 1950), pp. 956–58.

The screen, of course, should adequately separate the bran particles having a particle size of over about 150 to 200 microns from the starch granules having a particle size of from 10 to 120 microns. Screens having openings ranging from 50 to 500 microns can accordingly be used to advantage herein.

Other conventional means such as screening centrifuges can be used to separate the bran from the hydromilled endosperm and germ. Examples of centrifuge screening devices include pusher screening centrifuges, centrifuges in which over-screen particles are propelled across the inner surface of a conical screen by a rotating helix or scroll, and open ended conical screen bowl centrifuges.

After removal of the bran, the hydromilled wheat product comprises primarily a dispersion of intact, ungelatinized starch granules which are disassociated from the protein matrix, portions of protein in a dispersed state which are not denatured or glutenized, a small amount of encapsulated oil, and a small amount of fibrous material derived from the bran envelope. Additionally, the aqueous medium contains, in solution, some soluble proteins, sugars, salts and pentosans.

Removing water from the hydromilled wheat product

A portion of the water must be removed from the aqueous hydromilled wheat product, after the bran is removed, to obtain a commercially usable product. Several methods are available for removing water, all of which are dependent upon the final end use of the hydromilled wheat product. In this regard, a relatively small portion of the water can be removed from the product and the product can then immediately be utilized as a dough ingredient. Additional ingredients are added to the concentrated hydromilled wheat product to form various dough mixtures for specialized purposes. The dough mixtures can be commercialized as refrigerated dough products or can be immediately baked and the final baked product sold. The product can also be more completely dried, if desired, forming a high-grade white flour or it can be dried and separated into the starch and gluten protein components.

If the product is to be used immediately as a dough ingredient, the preferred method of concentrating the aqueous hydromilled wheat product is by centrifugation. The supernatant liquid obtained from centrifugation can be recycled and added to the wheat prior to the grinding step. In this manner, the soluble components of the wheat such as soluble proteins, sugars, salts and pentosans are obtained in more concentrated form. The supernatant liquid, after concentration by recycling, can be spray dried or concentrated by other conventional means and added back into the hydromilled wheat product. Other ingredients are then added to the hydromilled wheat product to form a commercial dough mixture which can be developed and either packaged as refrigerated dough or immediately baked.

If high-grade flour is desired or if it is desired to separate the gluten and starch components, the aqueous hydromilled wheat product may advantageously be spray dried. Spray drying is a conventional means of concentrating aqueous dispersions containing starch and protein. In this method, the dispersion is pumped through the spray nozzles at the top of the spray-drying column and dried quickly at high temperatures. The high temperature, fast drying does not adversely effect the starch or gluten protein because of the short residence time in a wet state. Both the starch and gluten are much more resistant to, respectively, gelatinization and denaturation in a dry state than in a wet state.

Other conventional drying, concentrating or separating procedures can also be used herein to obtain the desired final product. Protein and starch fractions can be obtained from the non-dried hydromilled wheat product by several liquid phase techniques including differential centrifuging or settling, filtration, screening, flotation and combinations thereof.

The starch granules and gluten proteins

Throughout this process the processing conditions are regulated to maintain substantially all of the starch granules in the intact, ungelatinized form and to maintain the gluten protein in an undenatured non-glutenized form. The temperature of the aqueous medium containing the hydromilled wheat product must be maintained at temperatures below 104° F. and preferably below 100° F. throughout the process to attain these ends.

Starch gelatinization is described and illustrat edin E. Pyler, Baking Science and Technology, vol. I (1952), pp. 15–17. Gelatinization is the phenomenon whereby discrete and dispersed starch granules become associated and, generally, lose their structural identity. Hydromilled wheat products containing gelatinized starch exhibit significantly poorer baking properties than comparable hydromilled wheat products which contain no gelatinized starch.

Starch gelatinization is described and illustrated in E. Nickels procedure. In this procedure, the hydromilled wheat product is examined with a microscope equipped with a polarizer and an analyzer. When the polarizer is in 0° position, the vibration plane of the light transmitted by it is at right angles to that of the analyzer at 0° position. When arranged in this relationship, the polarizer and analyzer are said to be crossed and no light will reach the eye piece if the medium between them is isotropic. Gelatinized starch is isotropic while non-gelatinized starch is not. The gelatinized starch can, therefore, be readily identified.

The gluten protein must be maintained in a nondenatured state in this hydromilling process to obtain a hydromilled product having good doughing properties. Generally, a subjective test for gluten protein denaturation is utilized which involves the observation of baked bread volumes.

EXAMPLES

The above-described steps describe a process for hydromilling wheat to obtain a final commercially utilizable hydromilled wheat product. The following examples are intended to further explain and illustrate the preferred methods of practicing this invention.

All parts, percentages and ratios set forth in the examples, as well as the preceding specification and the claims appended hereto, are by weight unless otherwise indicated. Temperatures are expressed in degrees Fahrenheit. Starch gelatinization was determined by the Cross-Nickels procedure and gluten protein denaturation was determined subjectively by viewing baked bread volumes.

Example I 400 grams of whole wheat (hard red variety) were combined with 1,000 milliliters of distilled water and 600 grams of tap water ice in a 5,800 milliter capacity Waring Blendor (Model CB–4). The wheat was ground for 5 minutes on the low speed setting. An additional 600 grams of tap water ice were added to the mixture and the grinding, on low speed, was continued for an additional 5 minutes. The ice maintained the temperature of the wheat-water mixture below 68° C. F. until about the last one-half minute when a temperature of 70° F. was attained.

The pH of the hydromilled wheat product was adjusted from pH 7.0 to pH 5.8 using 0.1 normal hydrochloric acid. The hydromilled wheat product was then sieved using a Sweeco laboratory sifter equipped with a No. 80 (177 microns) screen. Most of the bran was retained on the screen and the starch and gluten were washed through the screen. A foam residue remained on the Sweeco screen after sieving and was washed through the screen by spraying with an additional 250 milliliters of distilled water.

The bran which remained on the screen was collected and dried at 115° F. in an air circulating oven. The filtrate was frozen, using a plate-type freezer, and then dried in a Stokes laboratory freeze dryer. The hydromilled wheat product containing the endosperm and the gem was then ground in a ball mill for approximately 15 minutes. The resulting hydromilled wheat product was used in the following recipe for baking bread:

FORMULA

| | Percent | Grams |
|---|---|---|
| Unbleached hydromilled wheat product (3% moisture) | 49.11 | 88.7 |
| Crisco shortening | 2.77 | 5.0 |
| Salt | .553 | 1.0 |
| Sugar | 3.60 | 6.5 |
| Dry milk | 3.32 | 6.0 |
| Compressed yeast | 1.11 | 2.0 |
| Arkady yeast food | .137 | .25 |
| Water (60% absorption) | 39.40 | 71.3 |

The hydromilled wheat product, shortening, salt, sugar, dry milk and yeast food were combined. The compressed yeast was added to room temperature tap water with stirring until dissolved. The total dry ingredients and the water with yeast dissolved therein were combined in the Hobart C–100 equipped with a McDuffee bowl and mixed on low speed for 6 minutes. The sides of the mixing bowl were scraped down periodically during mixing. The resulting dough was fermented at 90% relative humidity at 90° F. for 2 hours. Then 140 grams of the dough were weighed into a pup loaf pan and proofed at 90% relative humidity at 100° F. for 1 hour. The dough was then baked at 425° F. for approximately 15 minutes.

A control loaf of bread was baked using the following recipe:

FORMULA

| | Percent | Grams |
|---|---|---|
| Unbleached, hard wheat flour (conventionally milled—12% moisture) | 54.23 | 98.0 |
| Crisco shortening | 2.77 | 5.0 |
| Salt | .553 | 1.0 |
| Sugar | 3.60 | 6.5 |
| Dry milk | 3.32 | 6.0 |
| Compressed yeast | 1.11 | 2.0 |
| Arkady yeast food | .137 | .25 |
| Water (60% absorption) | 34.28 | 62.0 |

The ingredients were mixed as described above, the dough was fermented, proofed, and baked in the same manner as the bread using the hydromilled wheat product.

The loaf of bread baked with the hydromilled wheat product had a volume of approximately 90% of that of the control. The dough utilizing the hydromilled wheat product was sticky and had good gluten development. The dough proofed well. The crumb structure and the flavor of the bread were good and the color of the interior of the loaf was a yellowish-tan.

The hydromilled wheat product utilized in making the break had a brownish-yellow color and a polyphenol oxidase activity of 18.8 and a pH of 6.4. There was no pre-treatment to reduce the polyphenol oxidase activity. The hydromilled wheat product contained about 1% by weight fiber and about 2% ash when analyzed on the basis of the original moisture content of 11.24%.

EXAMPLE II

Three 400-gram samples of whole wheat (hard red variety) were heat treated in 4,000 milliters of boiling tap water, for, respectively, 30 seconds, 2 minutes and 5 minutes. In each case, the heat-treated wheat was immediately collected on a U.S. Standard No. 40 sieve (420 microns), and then flushed with cold tap water for approximately 2 minutes until cool. The heat treated wheat, 1,000 milliliters of distilled water and 600 grams of ice utilizing distilled water were combined in a 5,800 milliliter capacity Waring Blendor (Model CB–4) bowl and the contents ground for 5 minutes on low speed. An additional 600 grams of ice utilizing distilled water were added. The grinding was continued for an additional 5 minutes.

The temperature of the aqueous hydromilled wheat product, in each case, ranged from about 32° F. to about 70° F. at the end of the grinding period. The hydromilled products were sieved using a Sweeco laboratory sifter equipped with a No. 120 (125 microns) screen. An additional 250 milliliters of distilled water were utilized to wash any foam residue through the Sweeco screen.

The filtrate from each of the samples was frozen using a plate-type freezer, then dried in a Stokes laboratory freeze dryer. The hydromilled wheat products were ground in a ball mill for approximately 15 minutes and then examined to evaluate color and functionability in baked products.

The hydromilled wheat products were utilized in the following formula.

Formula:

| | Percent |
|---|---|
| Hydromilled wheat product—3% moisture | 49.11 |
| Crisco shortening | 2.77 |
| Salt | 0.553 |
| Sugar | 3.60 |
| Dry milk | 3.32 |
| Compressed yeast | 1.11 |
| Arkady yeast food | 0.137 |
| Water (60% absorption) | 39.40 |

Three separate doughs were prepared utilizing, respectively, the hydromilled wheat product from the 30 second heat treatment, the 2 minute heat treatment and the 5 minute heat treatment. In each case, the hydromilled wheat product, shortening, salt, sugar, dry milk and yeast food were combined. The compressed yeast was added to room temperature tap water with stirring until dissolved. The total dry ingredients and the water with yeast dissolved therein were combined in the Hobart C–100 equipped with a McDuffee bowl and mixed on low speed for 6 minutes. The sides of the mixing bowl were scraped down periodically during mixing. The resulting dough was fermented at 90% relative humidity and 90° F. for 2 hours, then 140 grams of the dough were weighed into a pup loaf pan and proofed at 90% relative humidity and 100° F. for 1 hour. The dough was then baked at 425° F. for approximately 15 minutes.

A control pup loaf of bread was baked in accordance with the control loaf of Example I.

The bread baked from the hydromilled wheat product that was treated for 30 seconds had good proofing, good crumb structure and good volume. The dough was quite sticky and had good gluten development. The interior loaf color was medium to light yellow. The polyphenol oxidase activity of the hydromilled wheat product was 8.3.

The dough prepared from the hydromilled wheat product which was heat treated for 2 minutes did not rise properly during fermentation or proof and the resulting bread volume was poor. The crumb structure of the bread was poor and the color of the loaf interior was a medium to light yellow. The polyphenol oxidase activity level was lower than 8.3 activity units.

Dough prepared from the hydromilled wheat product which had been heat treated for 5 minutes had poor gluten development. The dough was sticky and slack and did not rise properly during fermentation or proof. The resulting bread volume was poor. The interior color of the bread was medium yellow and the crumb structure was poor. The polyphenol oxidase level was 1.4 activity units.

The dough utilized in the control loaf was nonsticky, easily manipulated and had excellent gluten development. The proof and crumb structure were good. The interior loaf color was very light yellow.

Treatment of the wheat with boiling water for 2-minute and 5-minute intervals significantly reduced the polyphenol oxidase levels but also apparently denatured the gluten protein and gelatinized a portion of the starch granules.

EXAMPLE III 400 grams of whole wheat (hard red variety) were heat treated in 4,000 milliliters of boiling tap water for 30 seconds. The heat treated wheat was immediately collected on a U.S. Standard No. 40 sieve and flushed with cold tap water for approximately 2 minutes until cool. The heat treated wheat, 1,000 milliliters of distilled water, and 600 grams of ice utilizing distilled water were combined in a 5,800 milliliter capacity Waring Blendor (Model CB-4) bowl and the contents were ground for 5 minutes on low speed. An additional 600 grams of ice utilizing distilled water were added to the Waring Blendor bowl and grinding was continued for an additional 5 minutes. The temperature of the water-wheat mixture during grinding ranged from 32° F. to 70° F. The ground wheat mixture was sieved using the Sweeco laboratory sifter equipped with a No. 120 (125 microns) screen. The foam residue remaining on the screen was washed through the screen with an additional 250 milliliters of distilled water. Substantially all of the bran was retained on the screen and substantially all of the components of the endosperm and germ were washed through the screen. The filtrate was dried using a Bowen spray dryer with inlet temperatures ranging from 155° F. to 170° F. and outlet temperatures ranging from 130° F. to 170° F.

The hydromilled wheat product was used in the recipe shown in Example I. The mixing procedure of Example I was used herein.

A control loaf of bread was baked using the recipe shown for the control loaf in Example I.

The hydromilled wheat product was medium yellow in color. The bread baked utilizing the hydromilled wheat product had fair volume when compared with the control loaf. The interior of the loaf baked from the hydromilled wheat product was medium yellow. The proof and crumb structure of the loaf were fair. The dough made from the hydromilled wheat product was sticky and there was fair gluten development.

Substantially all of the starch granules were intact and ungelatinized and the gluten protein was in an undenatured and nonglutenized form in the hydromilled wheat product prior to use herein.

EXAMPLE IV 40 grams of whole wheat (hard red variety) were heat treated in 4,000 milliliters of boiling tap water for 30 seconds. The heat treated wheat was immediately collected on a U.S. Standard No. 40 sieve and then flushed with cold tap water for approximately 2 minutes until cool. The heat treated wheat and 1,000 milliliters of distilled water were combined in a 5,800 milliliter capacity Waring Blendor bowl and the contents were ground for 6 minutes on the low speed setting. 475 grams of ice utilizing distilled water were added during grinding to maintain the temperature of the aqueous hydromilled wheat product at approximately 72° F.

The hydromilled wheat products were sieved using a Sweeco laboratory sifter equipped with a No. 230 (63 microns) screen. An additional 250 milliliters of distilled water were utilized to wash the foam residue through the Sweeco screen.

The filtrate was adjusted to pH 5.6 using 0.1 normal hydrochloric acid and then the filtrate was frozen using a plate-type freezer. The frozen filtrate was then dried in a Stokes laboratory freeze dryer (thereby recovering all of the soluble components of the wheat). The dried, hydromilled wheat product containing the endosperm and germ components was placed in a polyethylene bag where it was kneaded by hand until a homogeneous powder was obtained. The bran residue remaining on the Sweeco screen was collected and dried in an air-circulating oven. The solids were quantitatively recovered for analysis.

The hydromilled wheat product obtained had a polyphenol oxidase activity level of 5.3. The sample was a light yellowish tan color and was a free-flowing powder.

The product was analyzed to determine the yield of solids by this process, the percentage of water in the final product, the percentage of protein in the final product, and the percent of fiber in the final product. Table 2 shows the analysis of the hydromilled wheat product as obtained from the freeze dryer, and as adjusted to 11.7% moisture.

TABLE 2.—ANALYSIS OF HYDROMILLED WHEAT PRODUCT
[Based on 100-gram sample]

|  | Hydromilled wheat product "as is" | Bran residue "as is" | Hydromilled wheat product (11.7% H₂O) | Bran residue (11.7% H₂O) |
|---|---|---|---|---|
| Weight in grams | 74.75 | 13.26 | 82.66 | 14.63 |
| Percent: |  |  |  |  |
| $H_2O$ | 2.36 | 2.60 | 11.70 | 11.70 |
| Protein | 15.08 | 16.16 | 13.60 |  |
| Fiber | 0.24 | 18.77 | 0.22 |  |

The total solids recovered in this hydromilling process amounted to 85.0 grams (based on the original 100-gram sample). This figure can be obtained by subtracting the moisture remaining in the hydromilled wheat product ("as is") and brain residue ("as is") from the sum of 74.75 grams and 13.26 grams (the recovered solids). The theoretical solids yield was 88.3 grams which was calculated by subtracting the original moisture content of 11.7% or 11.7 grams from 100 grams. It should be noted that the fiber content of the hydromilled wheat product was very low indicating that most of the bran had been successfully separated from the endosperm and germ components.

A portion of the hydromilled wheat product "as is" was adjusted to 12% moisture and combined with 0.0595% benzoyl peroxide (a bleach). This hydromilled wheat product was substantially lighter in color than the untreated hydromilled wheat product. The polyphenol oxidase activity of the hydromilled wheat product "as is" was 5.3. Any of the standard bleaching agents can be used to reduce the color of the hydromilled wheat product.

The untreated hydromilled wheat product was used in the recipe for baking bread of Example II. The hydromilled wheat product, shortening, salt, sugar, dry milk and yeast food were combined. The compressed yeast was added to room temperature tap water with stirring until dissolved. The dry ingredients and the water with yeast dissolved therein were combined in a farinograph equipped with a 50-gram bowl jacket heated to 86° F. and mixed on low speed for 1 minute. After 1 minute of mixing on low speed, the sides of the mixing bowl were scraped down and then the ingredients were mixed for an additional 6 minutes at high speed. The dough was fermented at 90% relative humidity and 90° F. for 2 hours. Then 70 grams of the dough were weighed into a divided pup loaf pan and proofed at 90% relative humidity and 100° F. for 1 hour. The dough was then baked at 425° F. for approximately 15 minutes.

The hydromilled wheat product treated with benzoyl peroxide was used in the following recipe for baking bread.

Formula: Percent
    Hydromilled wheat product (treated) _____ 54.23
    Crisco shortening _____ 2.77
    Salt _____ .553
    Sugar _____ 3.60
    Dry milk _____ 3.32
    Compressed yeast _____ 1.11
    Arkady yeast food _____ .137
    Water (60% absorption) _____ 34.28

The same procedure utilized in preparing the bread from the hydromilled wheat product ("as is") was used to prepare this product.

A control pup loaf of bread was prepared in accordance with the control of Example I.

The dough utilized in the control loaf was nonsticky, easily manipulated and had excellent gluten development. The proof and crumb structure of the bread baked from this dough were good. The interior loaf color was very light yellow. The volume of the control loaf was 276 cubic centimeters. The dough prepared from the hydromilled wheat product "as is" was somewhat sticky, had fair gluten development and fair proof. The crumb structure of the bread prepared from the dough was good. The color of the loaf interior was a light, tannish yellow. The volume of the baked loaf was 183 cubic centimeters.

The dough from the treated hydromilled wheat product was somewhat sticky, had good gluten development and good proof. The color of the baked loaf interior was a very light yellow and corresponded to the color of the control. The crumb structure was good. The volume of the baked loaf was 236 cubic centimeters.

Substantially all of the starch granules were intact and ungelatinized and the gluten protein was in an undenatured and non-gluteized form in the hydromilled product prior to use herein.

EXAMPLE V 100 grams of whole wheat (hard red variety) were steeped in 100 milliliters of tap water at 72° F. for 21.5 hours. 61 milliliters of water were absorbed by the wheat during that time period. An additional 211 milliliters of tap water were added to the mixture of wheat and water and combined with 10 grams of oil in a 1,250 milliliter capacity Waring Blendor bowl and ground for 1 minute on the low speed setting. The resulting mixture was poured through a household sieve. The filtrate was centrifuged for 5 minutes at 2,000 r.p.m., using an International refrigerated centrifuge equipped with a No. 259 centrifuge head. The supernatant and bran residue which did not pass through the sieve were combined and returned to the Waring Blendor. This procedure was repeated three times for additional grinding intervals of 15 seconds duration.

The hydromilled wheat product was recombined with the supernatant liquid containing any wheat solubles, mixed on low speed in the Waring Blendor for 15 seconds, and then sieved through cheese cloth to collect any residue bran. The filtrate was centrifuged for 5 minutes at 2,000 r.p.m. using an International refrigerated centrifuge equipped with a No. 259 centrifuge head.

The supernatant liquid containing the wheat solubles was analyzed and then discarded. The insoluble portion of the hydromilled wheat product was air dried at 72° F. and 40% relative humidity for about 24 hours and then ground with a hammer mill equipped with a 0.12 inch screen. The bran residues were also collected and dried in an air circulating oven.

The analysis of the product is shown below in Table 3.

TABLE 3.—ANALYSIS OF HYDROMILLED WHEAT FRACTIONS

|  | Insoluble fraction | Bran residue | Soluble fraction |
| --- | --- | --- | --- |
| Solids, grams (containing 11.24% water) | 81.35 | 19.75 | 8.38 |
| Percent: |  |  |  |
| Water | 11.24 | 11.24 | 11.24 |
| Protein | 9.12 | 17.87 | 25.42 |
| Fat (Skelly F extract) | 8.0 | — | 1.27 |
| Fiber | .29 | — | — |

NOTE.—(—) Indicates no analysis.

The insoluble portion of the hydromilled wheat product was utilized in the following recipe for baking bread.

Formula:
    Insoluble residue _____grams__ 100
    Sugar _____do____ 5
    Salt _____do____ 1
    Compressed yeast _____do____ 3
    Potassium bromate _____parts per million__ 20

The ingredients were mixed in the normal manner and the resulting dough was fermented at 94% relative humidity and 86° F. for 1½ hours. Then the dough was transferred to a pup loaf pan and proofed for 55 minutes after which it was baked at 400° F. for 25 minutes.

The insoluble portion of the hydromilled wheat product performed poorly as a flour replacement in the yeast leavened lean bread dough formulation. The volume of the insoluble residue bread load was 305 cc. as compared to the control volume of 785 cc.

Hydromilled wheat product was obtained using this process wherein the soluble portion was utilized with the insoluble portion of the hydromilled wheat product. The dough utlizing the entire hydromilled wheat product including both the insoluble and soluble portions thereof was utilized in a dough. The dough was sticky and had good development. The dough proofed well and the crumb structure and flavor of the bread were good.

The oil utilized in this experiment was Durkex 500, a product of the Durkee Company, which is a fractionated soy bean oil of high stability. Substantially the same results are obtained in this example when any of the following high-stability oils which melt below 104° F. are utilized herein: coconut oil, corn oil, palm oil, olive, oil, safflower oil, soybean oil, sunflower oil, peanut oil and cottonseed oil.

Substantially the same results are obtained when the wheat-to-water ratio is varied from 1:3 to 1:2. When the wheat-to-water ratio, in this example, is altered to 1:1, there is no gluten development but the resulting mixture of wheat and water is very difficult to sieve. A good separation of hydromilled wheat product and bran is only achieved with difficulty.

Substantially the same results are also obtained when the ratio of parts by weight oil per part of wheat are varied from 0.0005:1 to 4:1. The albumin and globular protein from the aleurone layer and the germ in each case, encapsulate the oil and prevent the oil from oxidizing. When the product is stored for long periods of time, there is no noticeable rancid odor.

Substantially all of the starch granules were intact and ungelatinized and the gluten protein was in an undenatured and non-glutenized form in the hydromilled product prior to use herein.

EXAMPLE VI

Results substantially similar to those achieved in the previous examples are obtained when the following wheats, or mixtures thereof, are substituted for the hard red wheat: hard red spring wheat, durum wheat, red durum wheat, hard red winter wheat, soft red winter wheat, and white wheat. Results substantially similar to those achieved in the previous examples are obtained when the wheat-to-water ratio is 1:10 and 1:15.

What is claimed is:

1. A process for hydromilling wheat to separate the wheat bran from the endosperm and the germ without adversely affecting the doughing and baking properties of the hydromilled wheat product containing the endosperm and the germ, said process comprising the steps of:
   (a) grinding wheat in an aqueous medium containing 3.5 to 15 parts by weight water per part by weight wheat at a temperature between the freezing point of the aqueous medium and 104° F. to reduce the endosperm and the germ components to a particle size of less than 200 microns while maintaining at least 90% by weight of the bran envelope above a minimum dimension of 150 microns thereby maintaining substantially all of the starch granules in the intact, ungelatinized form and maintaining substantially all of the gluten protein in an undenatured non-glutenized form;
   (b) separating the bran from the aqueous hydromilled wheat product containing the endosperm and germ components; and
   (c) removing a portion of the water from said hydromilled wheat product containing the endosperm and germ components.

2. The process of claim 1 wherein the temperature during the grinding step is maintained below 100° F. and the ratio of water to grain is at least 4.5:1.

3. The process of claim 2 wherein, in the grinding step, at least 95% by weight of the bran envelope is maintained above a minimum dimension of 200 microns.

4. The process of claim 2 wherein the pH of the hydromilled wheat product after the grinding step is maintained below pH 7.0.

5. The process of claim 4 wherein the wheat is treated under conditions suitable to reduce the polyphenol oxidase activity in the wheat, prior to the grinding step, from an activity level of about 20 activity units to a polyphenol oxidase activity level of not more than 9 activity units.

6. The process of claim 5 wherein the pH of the hydromilled wheat product, after the grinding step, is adjusted to between 5.6 and 6.1.

7. The process of claim 6 wherein the polyphenol oxidase activity is reduced to below 5.0 activity units.

8. The process of claim 5 wherein the ratio of water to wheat ranges from about 4.5:1 to about 8.0:1 and wherein substantially all of the albumin and globular proteins are maintained, throughout the process, in an undenatured form.

9. The process of claim 9 wherein the temperature during the grinding step is maintained at between 32° F. and 72° F.

10. The process of claim 9 wherein the pH of the hydromilled wheat product, after grinding, is adjusted to 5.8.

11. The process of claim 9 wherein the bran is separated from the aqueous hydromilled wheat product with a vibrating screen, the screen having openings ranging from about 50 to about 500 microns.

12. The process of claim 9 wherein a major portion of the water is removed from the hydromilled wheat product by spray drying.

13. The process of claim 9 wherein a major portion of the water is removed by freeze drying.

14. The process of claim 9 wherein a major portion of the water is removed from the hydromilled wheat product by centrifuging.

15. The process of claim 14 wherein the water-soluble materials in the supernatant liquid from the centrifuging step are recovered and added to the hydromilled wheat product.

16. A process for hydromilling wheat to separate the wheat bran from the endosperm and the germ without adversely affecting the doughing and baking properties of the hydromilled wheat product containing the endosperm and the germ, said process comprising the steps of:
   (a) grinding wheat in an aqueous medium containing 1 to 15 parts by weight water per part by weight wheat and from 0.0005 to 4 parts by weight oil per part by weight wheat at a temperature between the freezing point of the aqueous medium and 104° F. to reduce the endosperm and the germ components to a particle size of less than 200 microns while maintaining at least 90% by weight of the bran envelope above a minimum dimension of 150 microns thereby maintaining substantially all of the starch granules in the intact, ungelatinized form and maintaining substantially all of the gluten protein in an undenatured non-glutenized form;
   (b) separating the bran from the aqueous hydromilled wheat product containing the endosperm and germ components; and
   (c) removing a portion of the water from said hydromilled wheat product containing the endosperm and germ components.

17. The process of claim 16 wherein the oil is an edible oil having a melting point below about 104° F.

18. The process of claim 17 wherein the temperature of the aqueous medium is maintained at a temperature between 32° F. and 100° F. and wherein the weight ratio of water to wheat ranges from 2:1 to 8:1.

19. The process of claim 18 wherein the pH of the hydromilled wheat product after the grinding step is maintained below pH 7.0.

20. The process of claim 19 wherein the wheat is treated under conditions suitable to reduce the polyphenol oxidase activity in the wheat, prior to the grinding step, from an activity level of about 20 activity units to a polyphenol oxidase activity level of not more than 9 activity units.

21. The process of claim 20 wherein the temperature of the aqueous medium during the grinding step is maintained at between 32° F. and 72° F.

References Cited
UNITED STATES PATENTS

| | | | |
|---|---|---|---|
| 2,358,827 | 9/1944 | Rakowsky et al. | 99—93 |
| 2,930,699 | 3/1960 | De Sollano et al. | 99—93 |

RAYMOND N. JONES, Primary Examiner

U. S. Cl. X.R.

426—463, 464, 507, 460, 484

UNITED STATES PATENT OFFICE
CERTIFICATE OF CORRECTION

Patent No. 3,788,861              Dated January 29, 1974

Inventor(s)    JACK R. DURST and WILLIAM C. WINTERS

It is certified that error appears in the above-identified patent and that said Letters Patent are hereby corrected as shown below:

On the drawing, please correct the inventor's name to read ---J. R. DURST--- in the first occurrence thereof.

In Claim 9, line 1, please delete "Claim 9" and insert therefor ---Claim 8---.

Signed and sealed this 7th day of May 1974.

(SEAL)
Attest:

EDWARD M. FLETCHER, JR.              C. MARSHALL DANN
Attesting Officer                    Commissioner of Patents